United States Patent [19]
Kingsley

[11] Patent Number: 5,847,706
[45] Date of Patent: *Dec. 8, 1998

[54] SIZEABLE WINDOW FOR TABULAR AND GRAPHICAL REPRESENTATION OF DATA

[75] Inventor: Paul Michael Kingsley, Colorado Springs, Colo.

[73] Assignee: Hewlett Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 564,849

[22] Filed: Nov. 30, 1995

[51] Int. Cl.⁶ .......................................................... G06F 3/14
[52] U.S. Cl. .............................................................. 345/342
[58] Field of Search ........................................ 395/342, 339, 395/340, 341, 343; 345/119, 342, 339, 340, 341, 343, 118

[56] References Cited

U.S. PATENT DOCUMENTS

| | | | |
|---|---|---|---|
| 5,001,697 | 3/1991 | Torres | 345/439 |
| 5,060,170 | 10/1991 | Bourgeois et al. | 345/342 |
| 5,434,964 | 7/1995 | Moss et al. | 345/342 |
| 5,487,143 | 1/1996 | Southgate | 345/342 |
| 5,513,342 | 4/1996 | Leong et al. | 345/340 |
| 5,544,288 | 8/1996 | Morgan et al. | 345/342 |
| 5,561,757 | 10/1996 | Sothgate | 345/340 |

*Primary Examiner*—Matthew M. Kim
*Assistant Examiner*—Crescelle N. dela Torre

[57] ABSTRACT

A system and method for resizing a window, containing a first display for displaying first data in a first format and a second display for displaying second data in a second format, to a height and a width, thereby creating a resized window. The system determines whether the first display can be drawn to a first scale thereby ensuring that the first display will fit within the resized window. If the first display will fit within the resized window, then the system draws the first display to the first scale. The system draws to a second scale the second display to a remaining area of the resized window after the first display is drawn. The second scale will consist of the entire window if the first display cannot be drawn to the first scale. The invention resizes the first display and the second display within the resized window to ensure a useful presentation of data.

34 Claims, 8 Drawing Sheets

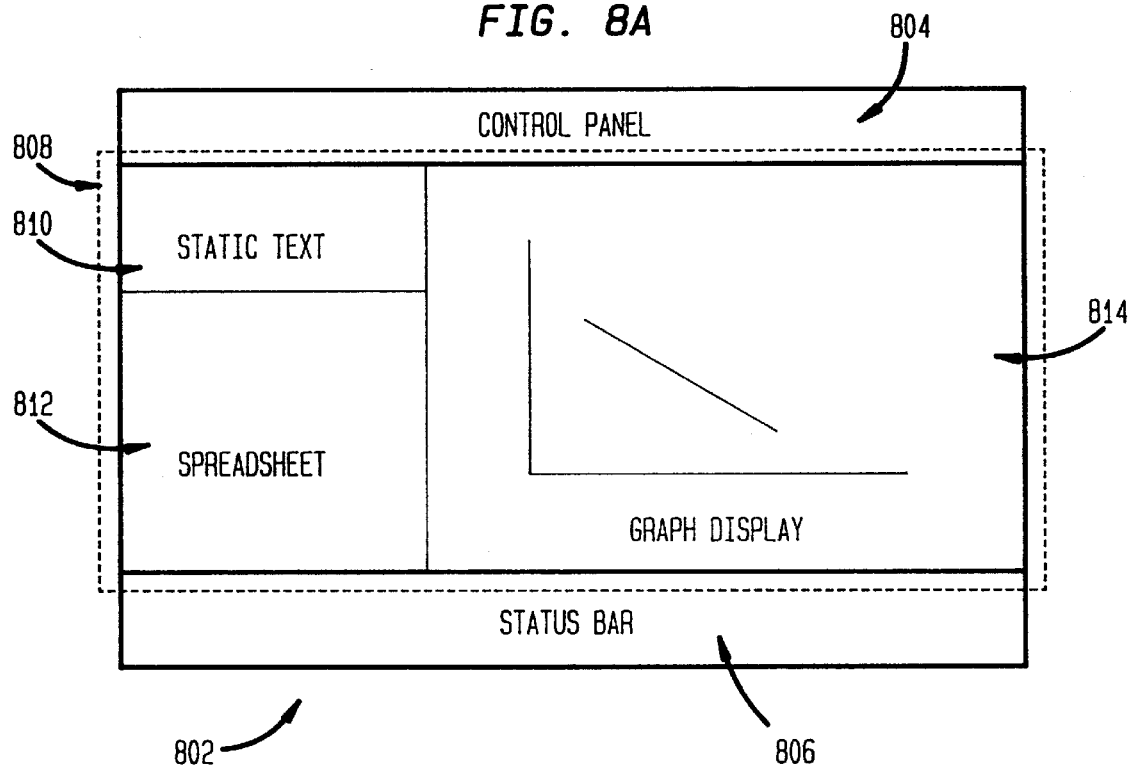
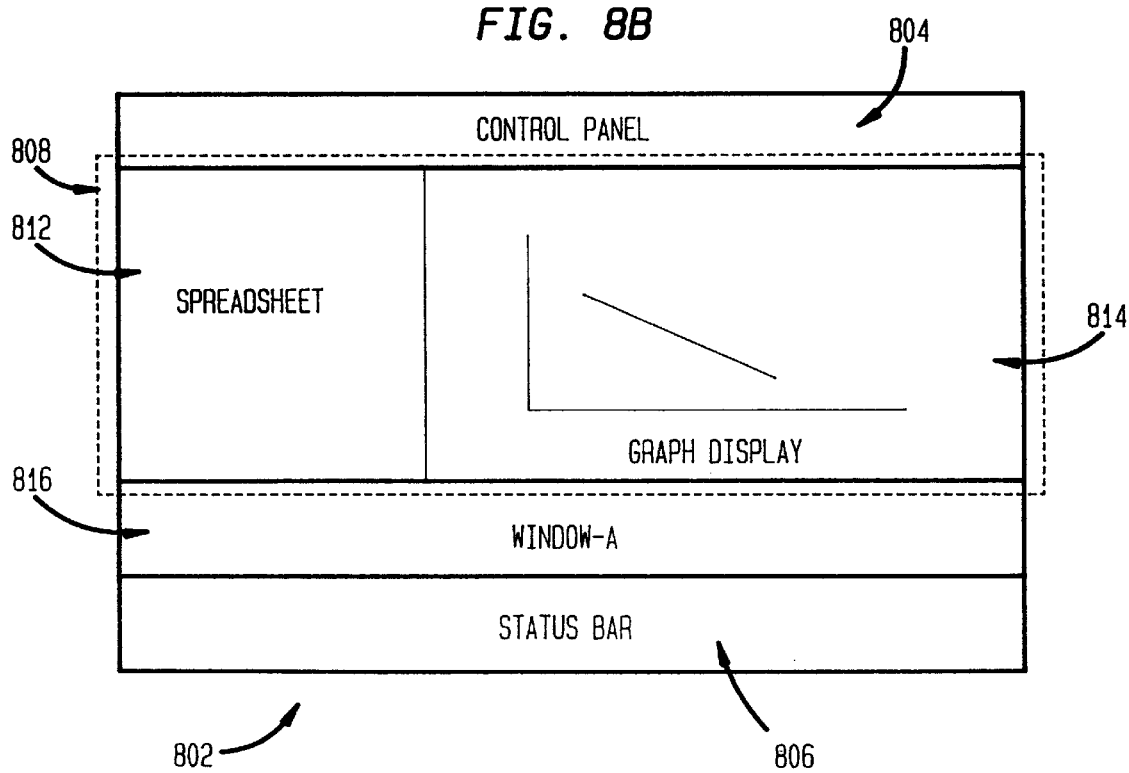

SIZEABLE WINDOW FOR TABULAR AND GRAPHICAL REPRESENTATION OF DATA

BACKGROUND OF THE INVENTION

1. Field of the Invention

This invention relates to computer window environments, and more specifically to a computer system and method that controls the resizing and repositioning of a window containing a tabular and graphical representation of data.

2. Related Art

One way in which computer programs have become increasingly user friendly is to employ a window type of user interface. Much of the power of the windows environment is based on the fact that an application can create multiple windows, each with a different function. A window manager maintains a list of windows created by all executing applications. The window manager associates windows with the applications in which they are created. When an application terminates, the window manager destroys the windows that the application created if the application itself has not already destroyed them.

In the windows environment, window controls are the building blocks of a windows application's user interface. Window controls include tools such as: static text control, buttons, edit controls, scroll bars, and list boxes. These controls become increasingly important to a user when working in an environment where multiple windows are displayed on a computer screen at one time. The user may constantly resize and reposition windows to view as much information as possible. A problem arises, however, when a window contains one or more displays that are not responsive to conventional resizing techniques.

To better understand this invention, it is useful to describe some additional terminology relating to windows. A window specifies an area of a computer screen, normally rectangular in shape, that an application dedicates to a specific function. The window provides a means for visually interfacing with a user. The window's maximum extent covers the entire rectangular area including the window's border if it has one. The client area specifies the maximum area of the window into which an executing application could draw. It includes the window's total area minus the border region, scroll bars, and any control buttons and text.

In contemporary window environments, a user resizes a window by grabbing the window's border and dragging it to a new position. The window manager redraws the window to the new size at the new position. The redrawing of the window, however, does not include the rescaling of the client area's contents. The window manager keeps the contents of the client area, including the size of the font, icons, and graphics, constant. If a user reduces the size of a window to a point that the client area's contents extend beyond the boundaries of the window's new client area, the window manager displays a portion of the contents that fits within the window's new client area along with scroll bars. The scroll bars allow the user to move through the contents of the window's new client area.

This implementation has several disadvantages. First, the appearance of scroll bars further reduces the viewable portion of the window's client area. A user may reduce a window's size only to find that the window's client area is reduced further due to the presence of scroll bars. Second, scroll bars can be very cumbersome when a user wants to view the client area of a window. A user may not be able to view a meaningful presentation of data because only a limited portion of the data is visible. A user must scroll between different positions of the client area to view the data.

An example of a window's client area that is greatly affected by the need for scroll bars upon a reduction in the window's size is a client area that displays data in multiple formats. For instance, a window may display both a tabular representation of data in a spreadsheet and a graphical representation of one or more of those data values. As noted above, upon reducing a window's size, contemporary window environments maintain the current window scale and format, and simply adds scroll bars. Therefore, the user must scroll through the client area to view a particular portion of the spreadsheet or graph that fits within the new size of the client area. If the user reduces the window small enough, the user may lose all benefit of the information because only a portion of the spreadsheet or graph remains visible.

A user would greatly benefit if, upon the resizing of a window containing data in multiple formats, the client area of the window maintained the presentation of meaningful data. The user would have continued access to meaningful data without the need for scrolling between various portions of the client area. Therefore, there is a continuing need to have an intelligent presentation of data which conforms the data to the resizing of windows.

SUMMARY OF THE INVENTION

The present invention solves the current problem of resizing and repositioning a window that contains a tabular representation of data in a spreadsheet and a graph display of data values from the spreadsheet. Upon the resizing and repositioning of the window, the present invention makes best use of the resized window's client area by drawing a re-scaled spreadsheet and graph display to the resized window, or drawing only the spreadsheet or only the graph display to the resized window. Therefore, the present invention ensures a continuous useful presentation of data that conforms to the new window size.

One way in which the present invention ensures a useful presentation of data is by retaining a constant width of the spreadsheet. A constant width allows for the resized window to present the spreadsheet data in a constant font style and size, thus ensuring that the data is always readable. The present invention fills in the remaining width of the resized window, the width remaining after drawing the constant width spreadsheet, with a resized version of the graph display.

The height of the spreadsheet and graph display is drawn equal to the new height of the resized window. Regarding the spreadsheet, the present invention proportionally adjusts the height of each row of the spreadsheet to fill the new height of the resized window's client area. However, if the height of the resized window is reduced to a size in which the spreadsheet data becomes unreadable, then the spreadsheet is not displayed. The entire client area is filled with a resized graph display. If the window is resized such that the spreadsheet would be readable, then the spreadsheet reappears.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears. In the drawings:

FIGS. 8(A)–(G) collectively illustrate a series of screens displaying various representations of a vitals display window that contains a spreadsheet and graph display of data. More specifically:

FIG. 8(A) is an illustration of a screen displaying a zoomed vitals display window containing both a spreadsheet and graphical representation of data;

FIG. 8(B) is an illustration of a screen displaying a combination of windows: window-A, and a vitals display window containing both a spreadsheet and graph display of data;

FIG. 8(C) is an illustration of a screen displaying a combination of windows: window-A, and a shorter vitals display window containing a shortened graph display of data;

FIG. 8(D) is an illustration of a screen displaying a combination of windows: a large window-A, and a very small vitals display window containing a very small graph display of data;

FIG. 8(E) is an illustration of a screen displaying a combination of windows: window-A, window-B, and a narrow vitals display window containing a spreadsheet and a narrow graph display of data;

FIG. 8(F) is an illustration of a screen displaying a combination of windows: window-A, window-B, and a very narrow vitals display window containing only a spreadsheet; and FIG. 8(G) is an illustration of a screen displaying a combination of windows: window-A, window-B, and a very narrow and tall vitals display window containing only a spreadsheet.

DETAILED DESCRIPTION OF THE PREFERRED EMBODIMENTS

The present invention solves the current problem of providing an intelligent presentation of data which conforms the data to the resizing of windows. More specifically, the present invention makes the best use of a resized window's client area, where the window contains a tabular representation of data in a spreadsheet and a graph display of data values from the spreadsheet, thereby ensuring a continuous useful presentation of data that conforms to the new window size.

Figure 1:
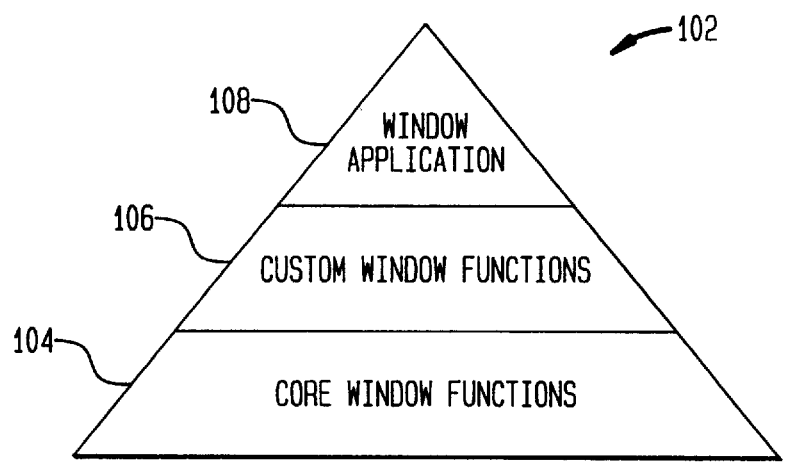
FIG. 1 is a block diagram illustrating the dependency of a windows application.

This invention provides a custom windows function for a windows application. FIG. 1 illustrates the implementation and dependency of a windows application. For example, a user develops a windows application 108 in a high level language such as C++, Fortran, Basic, Pascal, Ada, or SmallTalk. A windows application 108 is one which uses window displays to interface with a user. Various software vendors, such as Microsoft, have provided window libraries for the high level programming languages. These window libraries provide high level languages with a set of subroutines having a standardized interface for creating, managing, manipulating, and terminating windows on a screen. The subroutines are called core window functions 104. Window applications 108 call the core window functions 104 to access window capabilities, thereby eliminating the need to continually redevelop window software. The core window functions 104 also provide window applications 108 with the capability of developing custom window functions 106. Custom window functions 106 allow a windows application 108 to develop its own implementation for a specific windows function while maintaining the standard windows function interface. Therefore, for its window displays, a windows application 108 can use custom window functions 106 for executing specific window capabilities as well as core window functions 104 for general window capabilities.

Figure 2:
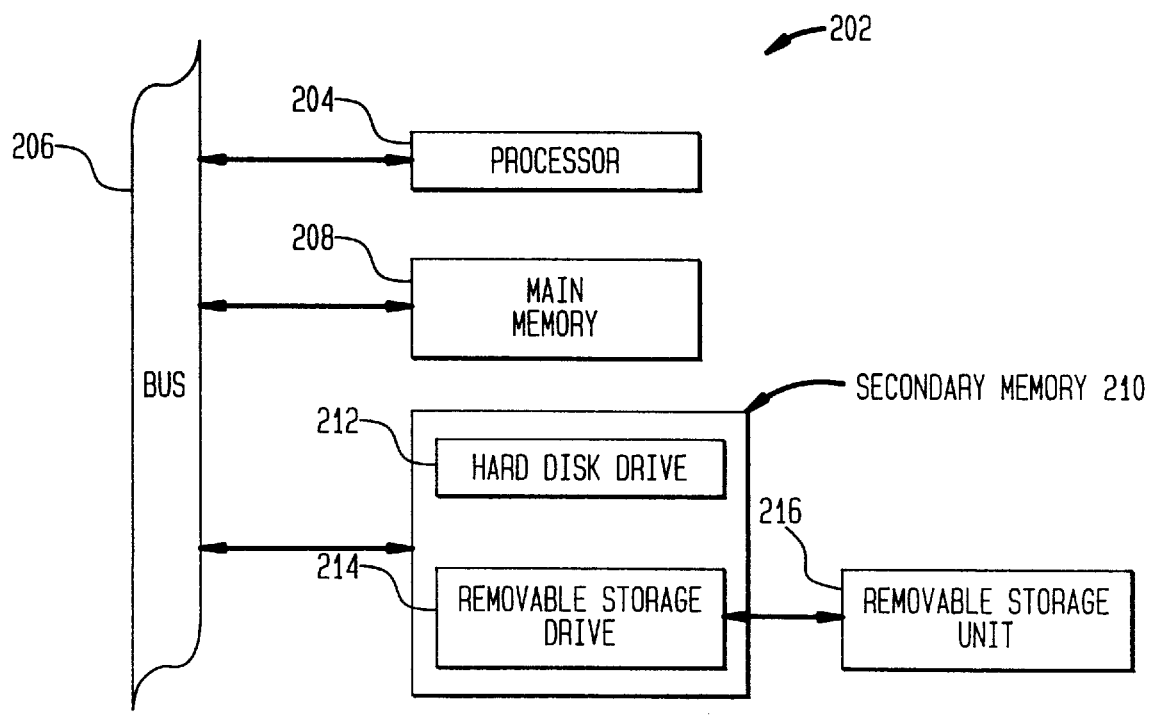
FIG. 2 is a block diagram illustrating an exemplary computer system.

The chosen embodiment of the present invention is a customized window function for resizing a window containing both a spreadsheet and a graph display. Accordingly, the chosen embodiment is computer software executing within a computer system. An exemplary computer system 202 is shown in FIG. 2. The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, etc. The removable storage drive 214 reads from and/or writes to a removable storage unit 216 in a well known manner.

Removable storage unit 216, also called a program storage device or a computer program product, represents a floppy disk, magnetic tape, compact disk, etc. As will be appreciated, the removable storage unit 216 includes a computer usable storage medium having stored therein computer software and/or data.

Computer programs (also called computer control logic) are stored in main memory 208 and/or the secondary memory 210. Such computer programs, when executed, enable the computer system 202 to perform the functions of the present invention as discussed herein. In particular, the computer programs, when executed, enable the processor 204 to perform the functions of the present invention. Accordingly, such computer programs represent controllers of the computer system 202.

In another embodiment, the invention is directed to a computer program product comprising a computer readable medium having control logic (computer software) stored therein. The control logic, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The present invention is described in terms of a computer program executing within a computer system 202. More specifically, the invention is described in terms of a customized Microsoft OnSizeo command in the high level programming language C++, and can be executed on an International Business Machine Corporation (IBM) compatible personal computer (PC) with at least an Intel 80486 microprocessor, 4 megabytes of random access memory (RAM), and executing Microsoft Windows. For more information on the Microsoft OnSize command, see Reference Volume I, *Class Library Reference for the Microsoft Foundation Class Library,* Microsoft Visual C++, Professional Edition, Development System for Windows, Version 1.5, which is incorporated herein by reference in its entirety. For more information on the programming language C++, see Craig Arnush, *Teach Yourself Turbo C++ for Windows in 21 Days,* SAMS Publishing, First Edition 1995, which is incorporated herein by reference in its entirety. Description in these terms is provided for convenience only. It is not intended that the invention be limited to application in this example environment. In fact, after reading the following description, it will become apparent to a person skilled in the relevant art how to implement the invention in alternative environments.

The chosen embodiment also implements a window containing both a tabular representation of data in a spreadsheet and a graph display of data values in the spreadsheet. The chosen embodiment uses Spread/VBX++, available by Far-Point Technologies, Incorporated, for creating and managing the spreadsheet. The chosen embodiment also uses ChartBuilder, available by Pinnacle Publishing, Incorporated, for creating and managing the graph display. These chosen embodiments are also for convenience purposes only. It is not intended that the invention be limited to application in this example environment. In fact, after reading the following description, it will become apparent to a person skilled in the relevant art how to implement the invention in alternative window environments displaying different data formats and representations.

To better understand the chosen embodiment of the present invention, it is useful to describe the display environment of the windows application in which the present invention operates. First, the windows application overlays the display screen with one window called the main application window. The main application window has a control panel, status bar, and a client area. The windows application draws different windows to the client area of the main application window. In the chosen embodiment, the title of the window that contains both the spreadsheet and the graph display of the data is the vitals display window. The vitals display window is one window that the windows application draws to the client area of the main application window. The vitals display window comprises a border, a client area into which the spreadsheet and graph display is drawn, and a control panel including a window title and control buttons. The present invention is invoked when a user of the windows application resizes the vitals display window. This chosen embodiment is for convenience purposes only. It is not intended that the invention be limited to such a windows application. It will become apparent to a person skilled in the relevant art how to implement and use this invention in any windows environment.

Figure 3:
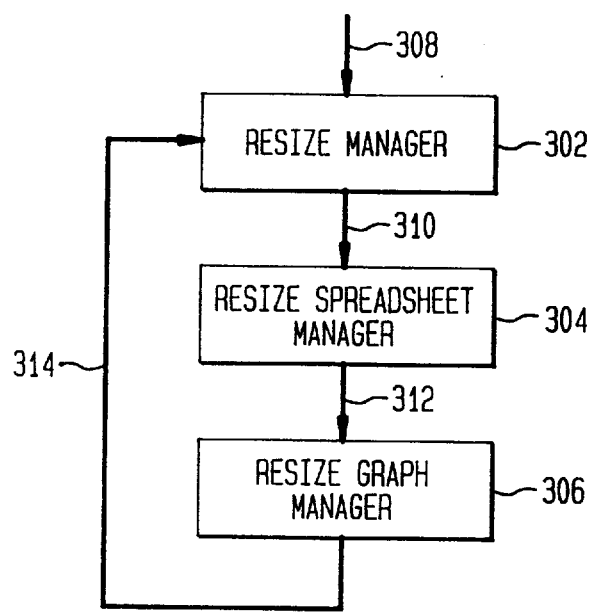
FIG. 3 is a block diagram illustrating the multiple components of the present invention for resizing a vitals display window containing both a spreadsheet and graph display of data.
Figure 4:
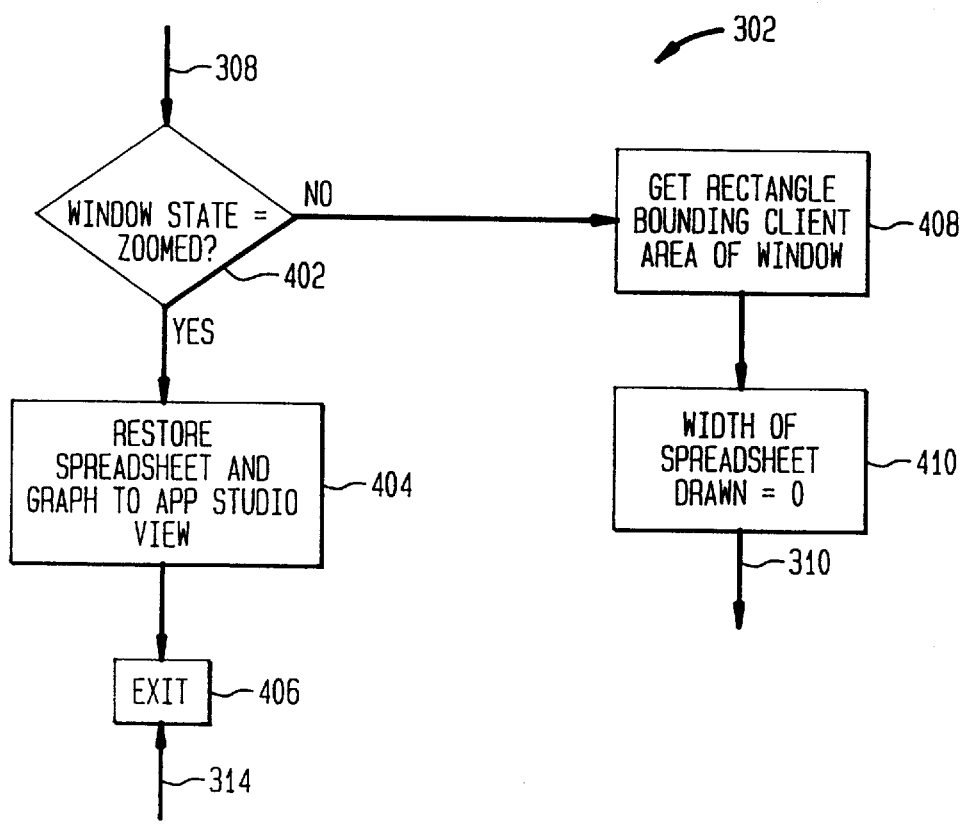
FIG. 4 is a control flow diagram illustrating the operations of the Resize Manager during the resizing of a vitals display window containing both a spreadsheet and graph display of data.
Figure 5:
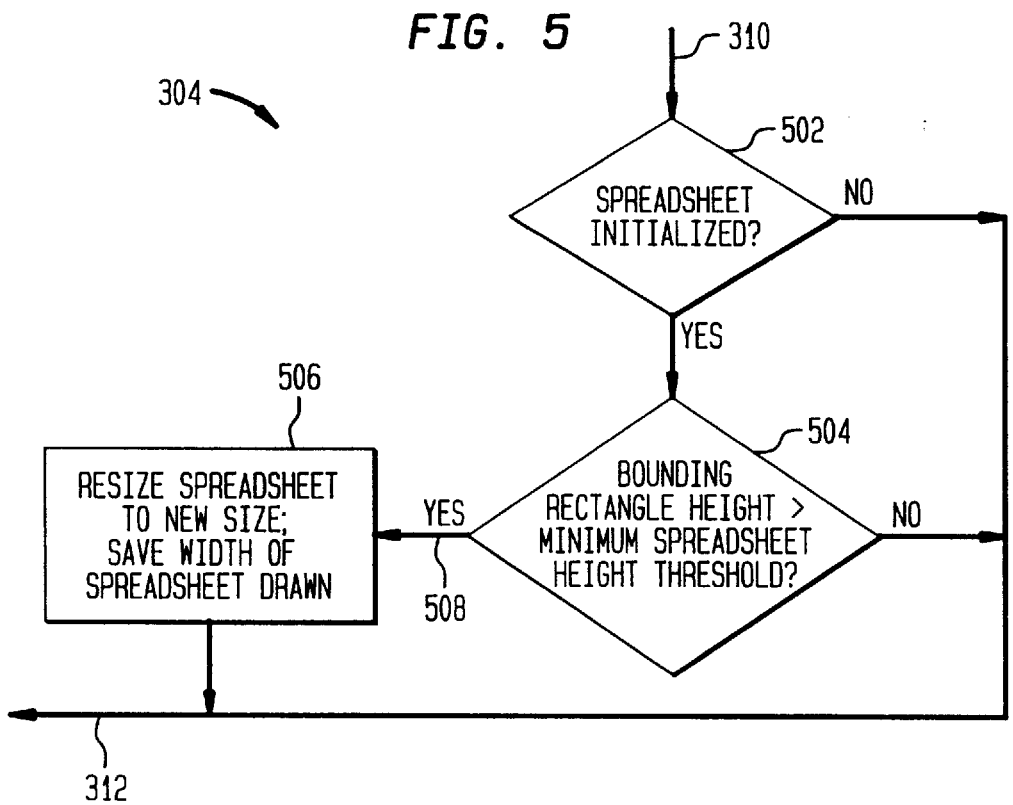
FIG. 5 is a control flow diagram illustrating the operations of the Resize Spreadsheet Manager during the resizing of a vitals display window containing both a spreadsheet and graph display of data.
Figure 6:
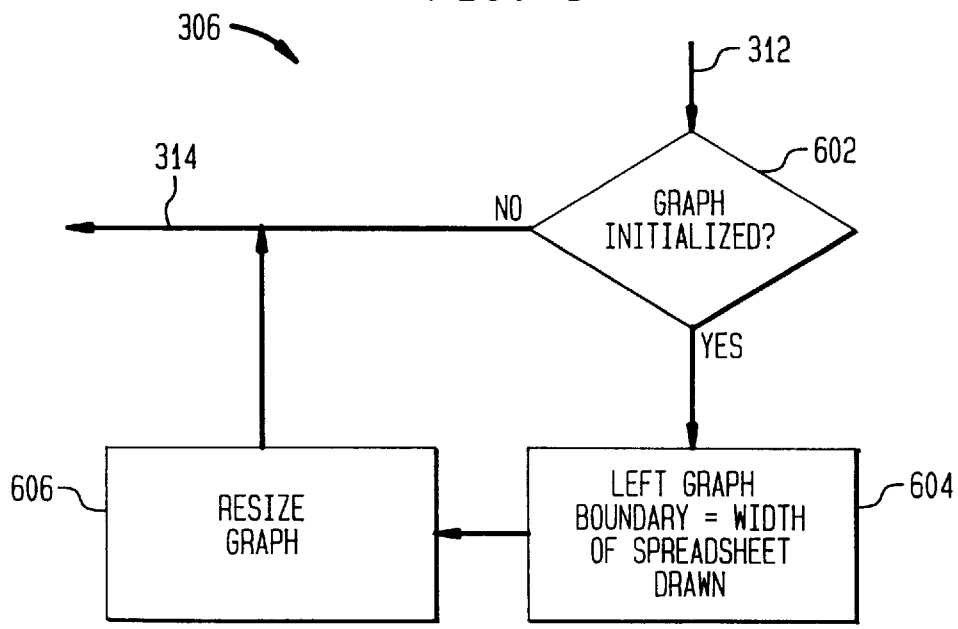
FIG. 6 is a control flow diagram illustrating the operations of the Resize Graph Manager during the resizing of a vitals display window containing both a spreadsheet and graph display of data.

FIG. 3 is a block diagram illustrating the chosen embodiment of the present invention. The present invention is decomposed into three components: Resize Manager 302, Resize Spreadsheet Manager 304, and Resize Graph Manager 306. FIG. 4 illustrates the control flow of the Resize Manager 302; FIG. 5 illustrates the control flow of the Resize Spreadsheet Manager 304; and FIG. 6 illustrates the control flow of the Resize Graph Manager 306.

When a user resizes a vitals display window, the windows application invokes the Resize Manager 302 at step 402 in FIG. 4. In step 402, the Resize Manager 302 determines if the state of the vitals display window is zoomed. The vitals display window is zoomed if its controls are merged with the main application window's controls, thereby allowing the vitals display window's client area to be equal to the main application window's client area. If the vitals display window is zoomed, the Resize Manager 302 proceeds to step 404. In step 404, the Resize Manager 302 restores the spreadsheet and graph display of the vitals display window to the App Studio view which is a well known type of display in the relevant art. The App Studio is a view created by using the App Studio tool of the visual C ++ developer's kit. The tool allows one to design a view with fixed positions for such things as buttons, edit boxes, and, in this case, spreadsheets, graphs, and static text. From step 404, the Resize Manager 302 proceeds to step 406 and exits, thereby retuning control to the windows application.

The following computer program code represents the best mode for the above detailed description of the Resize Manager 302:

```
//create custom implementation for OnSize which
//resizes a vitals window display containing a
//spreadsheet and a graph
void CStatsView::OnSize(UINT nType, int cx, int cy)
{
//declare local variables
int nSpreadWidth;
RECT CRect;
CWnd* pWnd;
//call base class method to perform standard processing
CBarFormView::OnSize(nType, cx, cy);
static int i = 0;
//parse the resizing command for the vitals display
//window
switch (nType){
  case SIZE__MAXIMIZED;
    break;
  case SIZE__MINIMIZED;
    break;
  case SIZE__RESTORED;
    //if vitals display window is zoomed (client area
    //is maximized) then display App Studio view
    if ( ((CBarFrameWnd *)GetparentFrame()) ->
      IsZoomed()) {
    //Restore to App studio definition for entire screen
    m__SS -> Move(m__pSSDefPos);
    ResizeSpreadSheet(M__pSSDefPos, m__SS);
    m__pGraph -> Move(m__GraphDefPos);
    //Show static controls which include : static text
    //box and 3-D shadowing effect of the spreadsheet
    //and graph display
    pWnd = GetDlgItem(IDC__VITALS__STATIC1);
    if (pWnd)
      pWnd -> ShowWindow(SW__SHOW);
    pWnd = GetDlgItem(IDC__VITALS__STATIC2);
    if (pWnd)
      pWnd -> ShowWindow(SW__SHOW);
    pWnd = GetDlgItem(IDC__VITALS__STATIC3);
    if (pWnd)
      pWnd -> ShowWindow(SW__SHOW);
    //exit custom OnSize command
    return
    }
//the following lines of source code are placed here.
}
```

Returning to step 402, if the vitals display window is not zoomed, the Resize Manager 302 proceeds to step 408. In step 408, the Resize Manager 302 retrieves the new size of the client area of the vitals display window into which it will draw the spreadsheet and graph display. From step 408, the Resize Manager 302 proceeds to step 410. In step 410, the Resize Manager 302 initializes the variable corresponding to the width of the spreadsheet display drawn to the vitals display window to zero (0). Next, the Resize Manager 302 invokes the Resize Spreadsheet Manager 304 by proceeding to step 502 on FIG. 5.

In step 502, the Resize Spreadsheet Manager 304 determines if the spreadsheet is initialized. The windows application initializes the spreadsheet during initialization of the application views. This step is a safety check on the windows application's initialization.

In step 502, if the spreadsheet is initialized, then the Resize Spreadsheet Manager 304 proceeds to step 504. In step 504, the Resize Spreadsheet Manager 304 compares the new height of the client area of the vitals display window to a minimum spreadsheet height. This test ensures that the spreadsheet is only drawn to the vitals display window if the client area of the vitals display window is greater than some minimum height threshold. The minimum height threshold represents a height below which the data in the spreadsheet would become unreadable. The minimum height threshold is calculated from the number of visible rows multiplied by the number of pixels that a row requires to be readable for a given font style and size. The chosen embodiment uses a fixed font style and size, and therefore, uses a constant in its calculation for the number of required pixels. It would be apparent to one skilled in the art to substitute for the constant a dynamic calculation of the minimum number of pixels required for different font styles and sizes.

Returning to step 504, if the height of the client area of the vitals display window is greater than the minimum height threshold, the Resize Spreadsheet Manager 304 proceeds to step 506. In step 506, the Resize Spreadsheet Manager 304 draws the spreadsheet to the new height of the client area of the vitals display window and saves the width of the spreadsheet. The height of the spreadsheet is automatically adjusted to fill the new height of the client area. In the chosen embodiment, the width of the spreadsheet is constant. It would be apparent to a person skilled in the relevant art to calculate a variable width. More details of step 506 are descibed below in FIG. 7. From step 506, the Resize Spreadsheet Manager 304 completes its execution and invokes the Resize Graph Manager 306 by proceeding to step 602 in FIG. 6.

Returning to step 504, if the height of the client area of the vitals display window is less than or equal to the minimum height threshold, the Resize Spreadsheet Manager 304 completes it execution and invokes the Resize Graph Manager 306 by proceeding to step 602 in FIG. 6.

Returning to step 502, if the spreadsheet is not initialized, then the spreadsheet is not drawn to the vitals display window. The Resize Spreadsheet Manager 304 completes its execution and invokes the Resize Graph Manager 306 by proceeding to step 602 in FIG. 6.

The following computer program code represents the best mode for the above detailed description of the Resize Spreadsheet Manager 304:

```
//get client area of resized vitals display window in which
//the spreadsheet and graph are to be drawn
GetClientRect(&cRect);
```

-continued

```
nSpreadWidth = 0;
//check if spreadsheet is initialized and
//if resized height > minimum height threshold
if ((m_SS) && (cRect.bottom > GetMinSpreadSize()))
{
   //Determine width of spreadsheet
   nSpreadWidth = (int)(m_SS ->
        GetNumProperty("Width"));
   cRect.Right = nSpreadWidth;
   m_SS -> Move(cRect);
   ResizeSpreadSheet(cRect,m_SS);
}
//create custom implementation for calculating the
//miniinum height threshold below which the spreadsheet
//will not be displayed because the rows would become
//unreadable. It would be readily apparent to a person
//skilled in the relevant art to modify GetMinSpreadSize
//to calculate the minimum number of pixels needed for
//any font style and size.
void CStatsView::GetMinSpreadSize()
{
  return (GetNumVisibleRows(m_SS) *
       MIN_SPREADSIZE_FF);
}
//This is the minimum number of pixels that a row
//in the spreadsheet requires so that the data is readable
//for a given font style and size.
#define MIN_SPREAD_SIZE_FF 14
```

In step 602 in FIG. 6, the Resize Graph Manager 306 determines if the graph is initialized. The windows application initializes the graph during initialization of the application views. This step is a safety check on the windows application's initialization.

In step 602, if the graph is not initialized, the Resize Graph Manager 306 completes its execution and returns to the Resize Manager 302 by proceeding to step 406 in FIG. 4. In step 406, the Resize Manager 302 exits and returns control to the windows application.

Returning to step 602 in FIG. 6, if the graph is initialized, the Resize Graph Manager 306 proceeds to step 604. In step 604, the Resize Graph Manager 306 sets the left edge of the graph display equal to the width of the spreadsheet. This assignment ensures that the left edge of the graph display is the right edge of the spreadsheet. After step 604, the Resize Graph Manager 306 proceeds to step 606. In step 606, the Resize Graph Manager 306 draws the graph to the new height and remaining width of the client area of the vitals display window. The remaining width is the width of the vitals display window's client area less the width allocated to the spreadsheet. After drawing the graph in step 606, the Resize Graph Manager 306 completes its execution and returns to the Resize Manager 302 by proceeding to step 406 in FIG. 4. In step 406 the Resize Manager 302 exits and returns control to the windows application.

The following computer program code represents the best mode for the above detailed description of the Resize Graph Manager 306:

```
if (m_pGraph)
{
   //if Graph is initialized, resize it to fit view
   GetClientRect(&cRect);
   cRect.Left = nSpreadWidth;
   m_pGraph -> Move(cRect);
   //Hide static controls that exist in the App Studio
   //view
   pWnd = GetDlgItem(IDC_VITALS_STATIC1);
   if (pWnd)
```

-continued

```
      pWnd -> ShowWindow(SW_HIDE);
      pWnd = GetDlgItem(IDC_VITALS_STATIC2);
      if (pWnd)
        pWnd -> ShowWindow(SW_HIDE);
      pWnd = GetDlgItem(IDC_VITALS_STATIC3);
      if (pWnd)
        pWnd -> ShowWindow(SW_HIDE);
      }
    break;
  default:
    break;
  }
}
```

Figure 7:
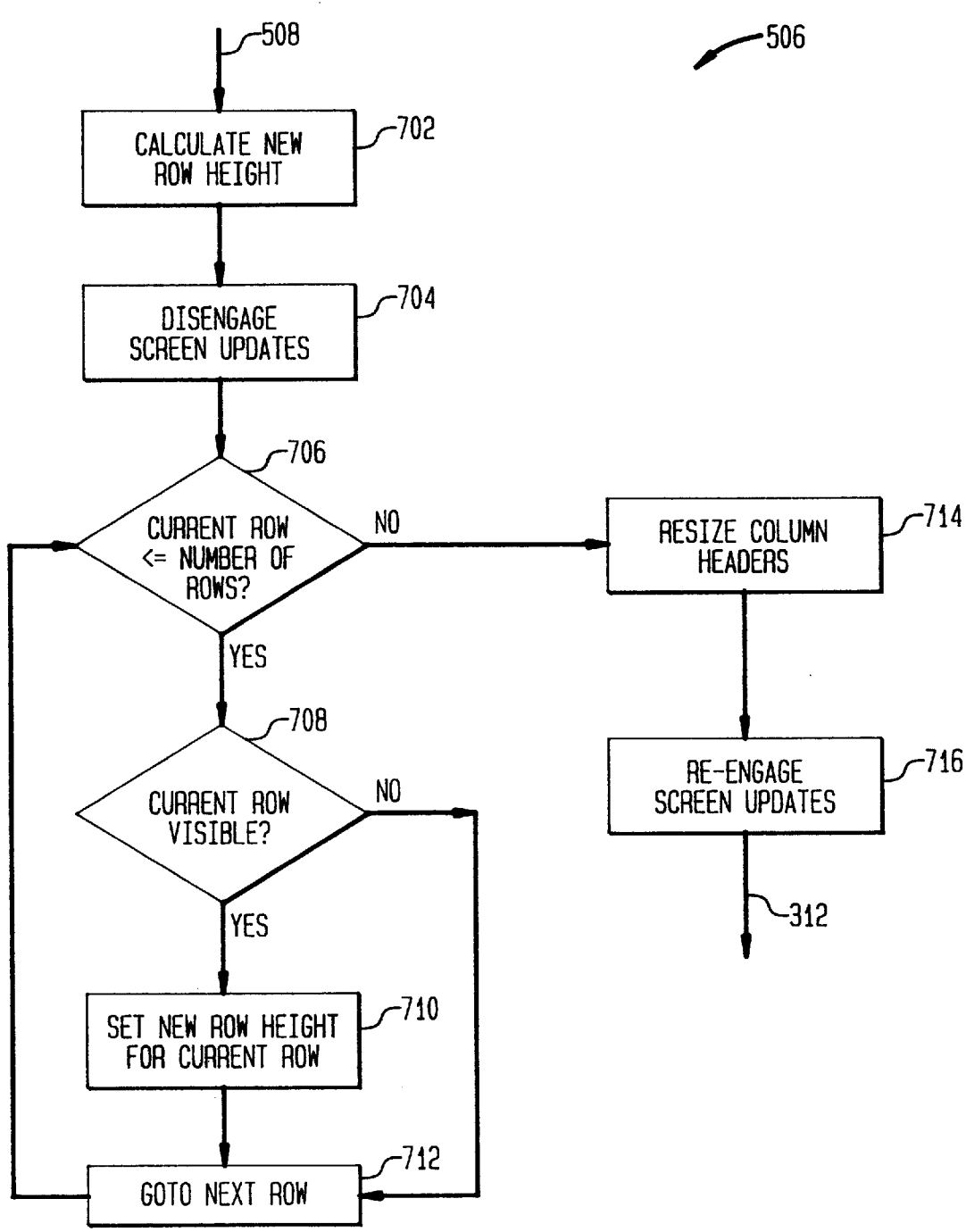
FIG. 7 is a control flow diagram illustrating the resizing of the spreadsheet within a vitals display window.

FIG. 7 illustrates the control flow for step 506 of the Resize Spreadsheet Manager 304 which draws a resized spreadsheet to the client area of the vitals display window. Upon entering step 506, the Resize Spreadsheet Manager 304 enters step 702. In step 702, the Resize Spreadsheet Manager 304 calculates a new height for the rows of the spreadsheet. The row height is adjusted such that the aggregate of all of the spreadsheet's rows fills the entire new height of the client area of the vitals display window. The new row height is rounded to the nearest pixel. From step 702, the Resize Spreadsheet Manager 304 proceeds to step 704. In step 704, the Resize Spreadsheet Manager 304 disengages screen updates. This action ensures that the screen will not be updated while the resized spreadsheet is being drawn to the screen. After disengaging updates, the Resize Spreadsheet Manager 304 proceeds to step 706.

The following computer program code represents the best mode for the above detailed description of steps 702–704 in FIG. 7 of the Resize Spreadsheet Manager 304:

```
//create custom implementation for Resizing the
//spreadsheet in a vitals window display
void CBarFormView::ResizeSpreadSheet(RECT cRect,
CVBControl* pSS)
{
//declare local variables
int nVisible, i;
long nMaxRows;
float nPixels, nPixelsSy, nInches, nTwips, nUsedPixels;
CDC *pCDC;
//get the # of rows in the spreadsheet and the # of rows
//that are visible
nMaxRows = pSS -> GetNumProperty("MaxRows");
nVisible = GetNumVisibleRows(pSS);
//get number of pixels per logical inch in
//vertical direction
pCDC = GetWindowDC();
nPixelsXy = pCDC -> GetDeviceCaps(LOGPIXELSY);
ReleaseDC(pCDC);
//get the # of pixels in the height of the client area
//of the new resized vitals display window
nPixels = ((float)cRect.Bottom)-((float)cRect.Top);
//adjust for 1 pixel wide border of cells and calculate
//the new height for each visible row of the spreadsheet
nPixels = ((float)nPixels-(float)nVisible)/(float)nVisible;
nPixels = ((float)floor(nPixels);
nInches = nPixels/nPixelsSy;
//1440 # twips per logical inch
nTwips = ((float)nInches*(float)1440);
nTwips = (float)floor(nTwips);
nUsedPixels = (((nTwips/1440) * npixelsSy) *
    (float)nVisible)+(float)nVisible;
//disengage screen updates
p_SS -> SetNumProperty("Redraw", FALSE);
//height set in Twips
p_SS -> SetNumProperty("UnitType", 2);
```

Returning to step 706, the Resize Spreadsheet Manager 304 begins the operation of setting the new height for each row of the spreadsheet. The Resize Spreadsheet Manager 304 initializes the current row to the first row of data in the spreadsheet. The Resize Spreadsheet Manager 304 checks if the current row exists in the spreadsheet by comparing the current row number with the number of rows in the spreadsheet. If the current row is less than or equal to the number of rows in the spreadsheet, the row is in the spreadsheet and the Resize Spreadsheet Manager 304 proceeds to step 708. In step 708, the Resize Spreadsheet Manager 304 checks if the current row is visible. A row is visible if it is to be displayed on the screen. If the current row is visible, the Resize Spreadsheet Manager 304 proceeds to step 710. In step 710, the Resize Spreadsheet Manager 304 sets the row height of the current row equal to the new row height as calculated in step 702. Therefore, when the current row is displayed on the screen, it will be drawn to the new correct height. From step 710, the Resize Spreadsheet Manager 304 proceeds to step 712.

Returning to step 708, if the current row is not visible, that is, it is to be hidden and not drawn to the screen, then the Resize Spreadsheet Manager 304 proceeds directly to step 712. By jumping to step 712, the Resize Spreadsheet Manager 304 does not set the current row's height equal to the new height.

In step 712, the Resize Spreadsheet Manager 304 advances the current row to point to the next row. From step 712, the Resize Spreadsheet Manager 304 returns to step 706 where the Resize Spreadsheet Manager 304 determines if the current row exists in the spreadsheet.

Returning to step 706, if the Resize Spreadsheet Manager 304 determines that the current row is not in the spreadsheet, that is, it is beyond the range of the spreadsheet, then the Resize Spreadsheet Manager 304 proceeds to step 714. In step 714, the Resize Spreadsheet Manager 304 resizes the column headings located in the first row of the spreadsheet. The height of the column headings row is resized to use up the remainder of the client area height that was not allocated to the data rows of the spreadsheet. Resizing the column headings separate from the data rows eliminates any empty space in the client area's height of the vitals display window due to the rounding of the new row height to the nearest pixel as calculated in step 702. From step 714, the Resize Spreadsheet Manager 304 proceeds to step 716. In step 716, the Resize Spreadsheet Manager 304 re-engages screen updates. After step 716, the Resize Spreadsheet Manager 304 exits step 506, thereby exits the Resize Spreadsheet Manager 304 and proceeds to step 602 of the Resize Graph Manager 306.

The following computer program code represents the best mode for the above detailed description of the Resize Spreadsheet Manager 304:

```
//loop through each visible row of the spreadsheet
//and set the height of each visible row to the new
//calculated height
for (i=1; i <= nMaxRows; i++)
{
  pSS -> SetNumProperty("Row", i);
  if (!pSS -> GetNumproperty("RowHidden"))
    pSS -> SetFloatProperty ("RowHeight", nTwips, i);
}
//resize column headers to use up remaining pixels
//increment column row by # of unused pixels
//Pixels += (((float)cRect.Bottom)-(float)cRect.Top))-
    (float)nUsedpixels;
npixels = (float)floor(npixels);
nInches = nPixels/nPixelSy;
```

-continued

```
//1440 is # of twips per logical inch
nTwips = ((float)nInches*1440;
nTwips = (float)floor(nTwips);
//set row = 0 (column heading) height to use up
//remainder of client area height
pSS -> SetFloatProperty("RowHeight", nTwip, 0);
//set height in pixels again
pSS -> SetNumProperty("UnitType",1);
pSS -> SetNumProperty("Redraw", TRUE);
}
```

FIGS. 8(A) through 8(G) collectively illustrate a series of screens displaying various representations of a vitals display window containing a spreadsheet and graph display of data. On each of these figures, the main application window 802 covers the entire screen and comprises the following: a control panel 804, a status bar 806, and a vitals display window 808. The vitals display window 808 may include one or more of the following: a static text window 810, a spreadsheet 812, and a graph display 814 of one or more of the data items from the spreadsheet 812.

FIG. 8(A) shows a zoomed view of a vitals display window 808. That is, the vitals display window's client area 808 covers the entire client area of the main application window 802. In this display, there is maximum room for the spreadsheet 812, graph display 814, and static text 810.

FIG. 8(B) shows a main application window 802 containing a combination of a vitals display window 808 and another window, Window-A 816, in its client area. Because of the presence of Window-A 816 in the main application window's 802 client area, the height of the vitals display window 808 has been shortened. Therefore, the static text 810 has been removed and the spreadsheet 812 and the graph display 814 have been resized to fill up the entire client area of the vitals display window 808. The rows of the spreadsheet 812 are made shorter to fit within the entire client area of the vitals display window 808.

Figure 8C:
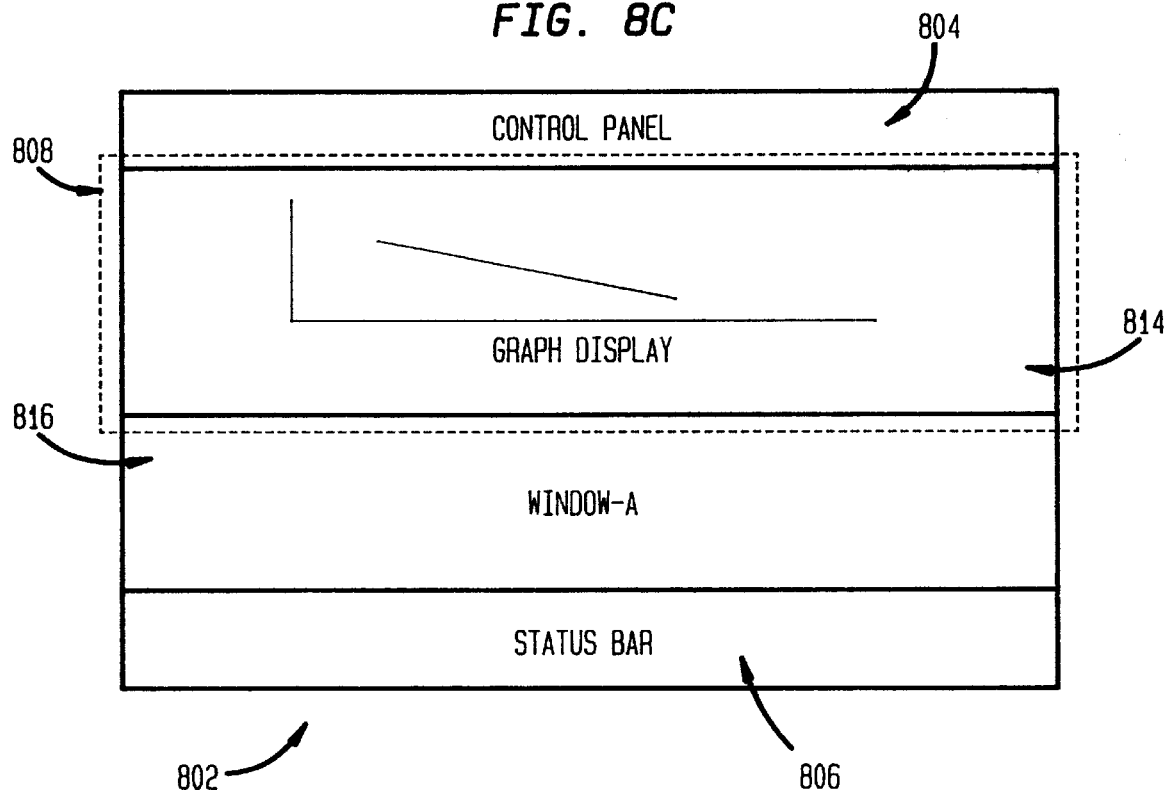

FIG. 8(C) shows the client area of a main application window 802 where Window-A 816 has been made taller and the vitals display window 808 was shortened to make room for it. The height of the vitals display window 808 is less than the minimum height threshold, therefore, the spreadsheet 812 is not drawn because the data would be unreadable. The graph display 814 is drawn to a scale such that it fills up the entire client area of the vitals display window 808.

Figure 8D:
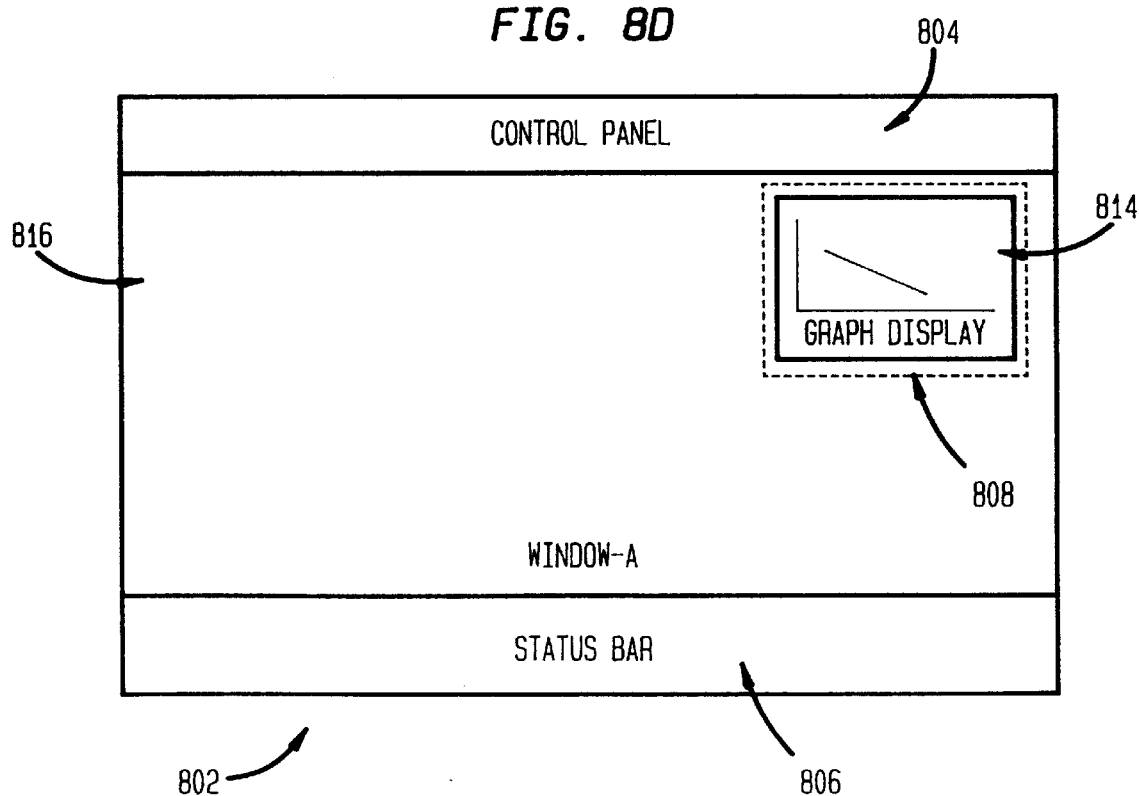

FIG. 8(D) shows a main application window 802 where Window-A 816 has been made larger so that it covers almost the entire client area of the main application window 802. The vitals display window 808 has been made very small. As with FIG. 8(C), the height of the vitals display window 808 is less than the minimum height threshold, therefore, the spreadsheet 812 is not drawn because the data would be unreadable. The graph display 814 is drawn to a scale such that it fills up the entire client area of the vitals display window 808.

Figure 8E:
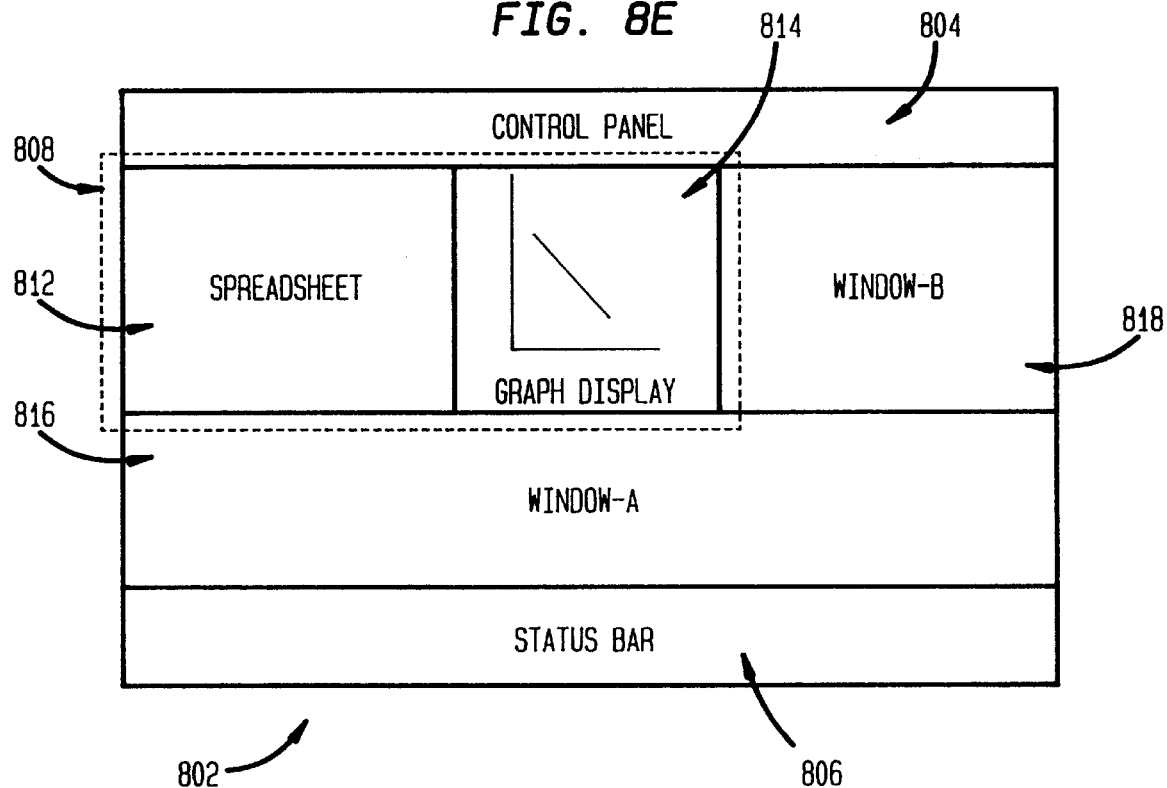

FIG. 8(E) shows a main application window 802 displaying a combination of a vitals display window 808 and two other windows, Window-A 816 and Window-B 818. Because of the presence of Window-A 816 and Window-B 818, the vitals display window 808 has been made both shorter and narrower. The spreadsheet 812 remains at a constant width, whereas the graph display 814 is drawn narrower to fill up the remaining width of the vitals display window 808.

Figure 8F:
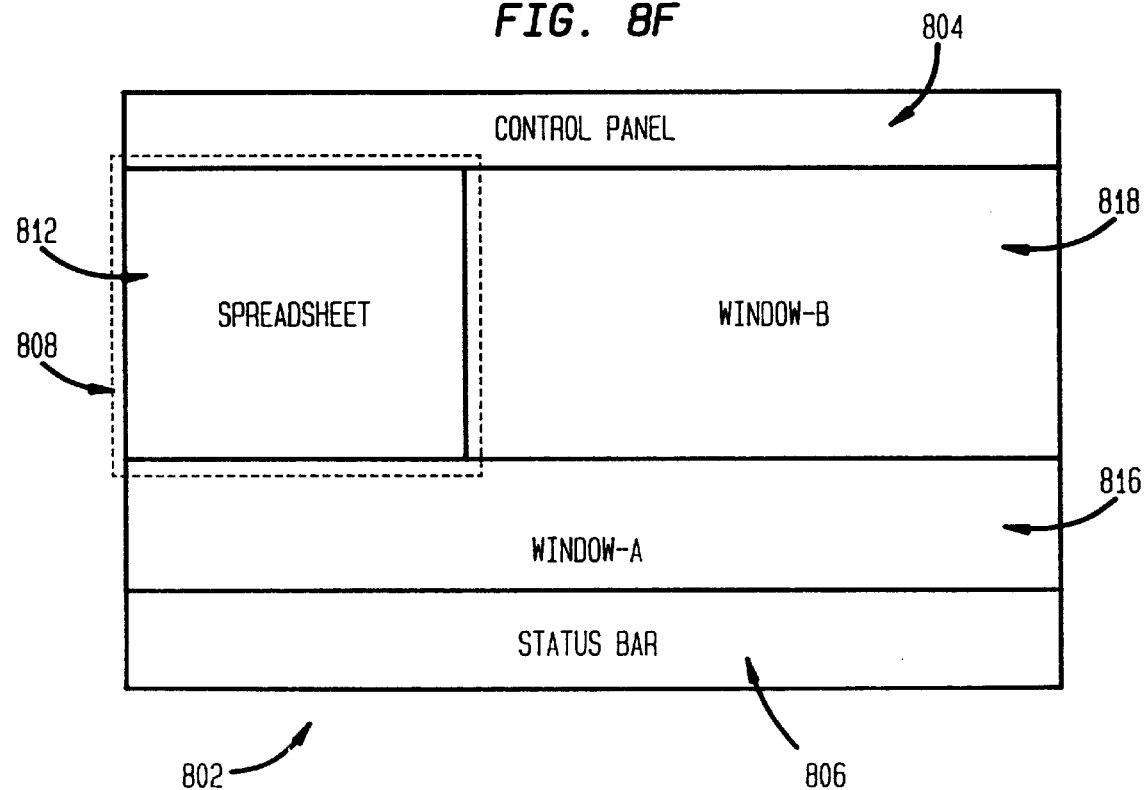

FIG. 8(F) shows a main application window 802 where Window-B is made wider such that the graph display 814 completely disappears from the vitals display window 808. The client area of the vitals display window 808 is only wide enough to accommodate the constant width of the spreadsheet, thus, only the spreadsheet 812 is drawn.

Figure 8G:
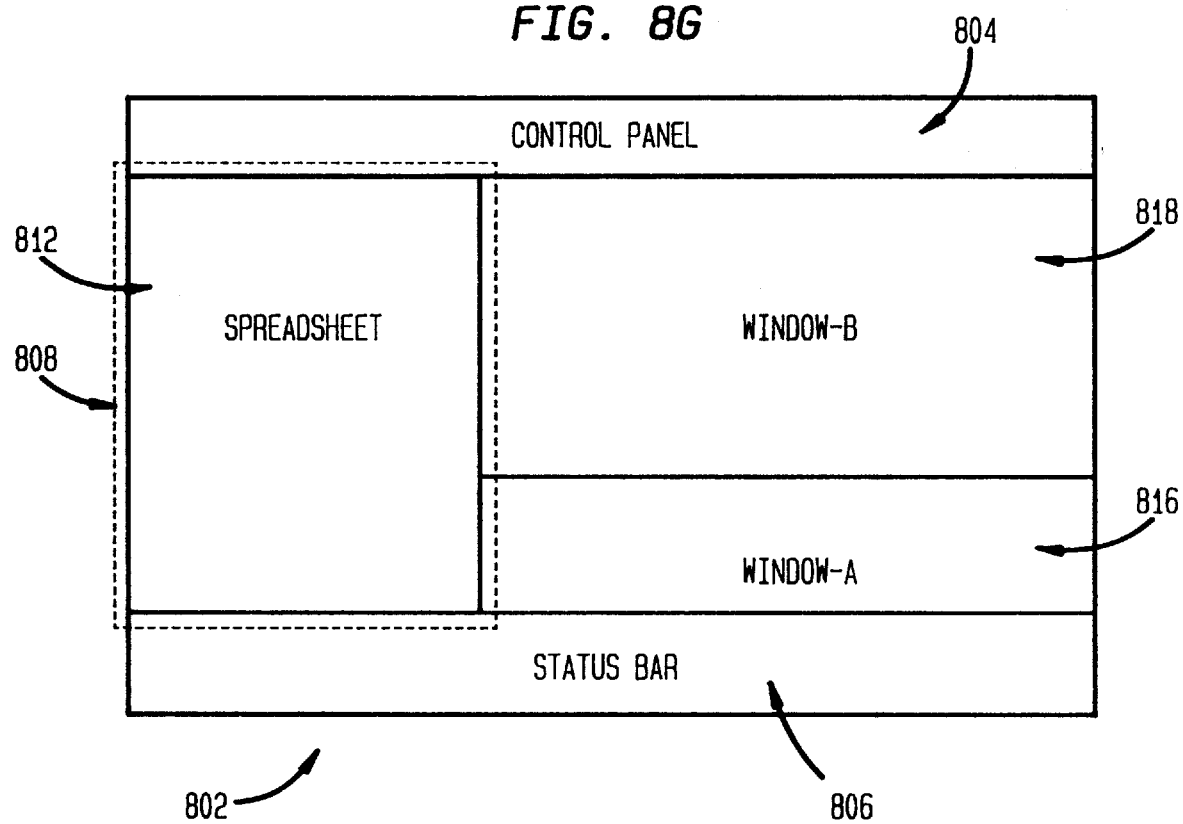

FIG. 8(G) shows a main application window 802 where the vitals display window 808 is made taller, and Window-A is resized to be narrower. The rows of the spreadsheet 812 are made taller to fill up the entire client area of the vitals display window 808. The vitals display window 808 is still too narrow for the display graph 814 to be drawn.

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer system for resizing a window containing a first display for displaying a first data in a tabular format and a second display for displaying a second data in a graphical format, to a height and a width thereby creating a resized window, comprising:

first drawing means for drawing within the resized window a resized first display to a first scale having a first height and a first width that fits within the resized window with said first data in the tabular format rescaled to conform to said resized first display, said resized first display drawn only when said first height is greater than a predetermined minimum height threshold representing a height below which the first data is considered to be unreadable in the tabular format; and second drawing means for drawing a resized second display within the resized window to a second scale having a second height and a second width to fill the height and a remaining width of the resized window, wherein the second data in the graphical format is rescaled to conform to said resized second display.

2. A computer system according to claim 1, wherein said computer system further comprising:

zoom determining means for determining if the resized window is zoomed; and zoom drawing means for drawing a zoomed view of the first display and the second display to the resized window if said zoom determining means determines that the resized window is zoomed.

3. A computer system according to claim 1, wherein said tabular format comprises a tabular representation of the first data in a spreadsheet, wherein said spreadsheet comprises a plurality of rows, and wherein said graphical format comprises a graphical representation of one or more data values in said spreadsheet.

4. A computer system according to claim 3, wherein said first drawing means comprises means for drawing the first display to a constant width, and wherein said first drawing means does not draw the first display when the width of the resized window is less than said constant width.

5. A computer system according to claim 3, wherein said first drawing means comprises:

means for proportionally adjusting said rows of said spreadsheet to fit within said first height of said resized first display.

6. A computer system according to claim 3, wherein said minimum height threshold is calculated from a number of visible rows multiplied by a number of pixels that a row requires to be readable for a given font style and size.

7. A computer system according to claim 6, wherein said given font style and size are constant and said required number of pixels are constant.

8. A computer system according to claim 6, wherein said given font style and size are not constant and further wherein said required number of pixels are dynamically determined.

9. A method for resizing a window on a computer screen, the window containing a first display for displaying first data in a tabular format and a second display for displaying second data in a graphical format, the resized window having a height and a width, the resized first display having a first width and a first height and the resized second display having a second width and a second height, the method comprising the steps of:

(a) determining whether the resized first display has a first height that is greater than a predetermined minimum height threshold representing a height below which the first data is unreadable when displayed in said tabular format;

(b) drawing to said first scale the first display when said step (a) determines that said first height is greater than said predetermined minimum height threshold;

(c) rescaling the first data in the tabular format to conform to the resized first display when said step (b) is performed;

(d) drawing a resized second display within the resized window to a second scale having a second height and a second width to fill the height and a remaining width of the resized window after said steps (b) and (c) are performed; and (e) rescaling the second data in the graphical format within the second display to conform to said resized second display.

10. A method according to claim 9, further comprising the steps of:

(f) determining, prior to said step (a), whether the resized window is zoomed; and (g) drawing, prior to said step (a) and after said step (d), a zoomed view of the first resized display and the second resized display to the resized window when said step (d) determines that the resized window is zoomed.

11. A method according to claim 9, wherein said minimum height threshold is calculated from a number of visible rows multiplied by a number of pixels that a row requires to be readable for a given font style and size.

12. A method according to claim 11, wherein said given font style and size are constant and said required number of pixels are constant.

13. A method according to claim 9, wherein said first width is a constant width, the method further comprising the steps of:

(f) determining, prior to said step (b), whether said constant width is less than or equal to the width of the resized window;

wherein said step (b) further includes the step of:

(1) drawing the first resized display to said constant width when said step (d) determines that said constant width is less than or equal to said resized window width.

14. A method according to claim 9, wherein said tabular format includes a plurality of rows of data, and wherein said step (b) comprises the step of:

(1) proportionally adjusting a plurality of rows of the first display to fit within the height of the resized window.

15. A computer program product for use with a windows environment, including a computer usable medium having computer readable program code means embodied in said medium for enabling a computer to resize a window containing a first display for displaying first data in a tabular format and a second display for displaying second data in a graphical format, to a height and a width thereby creating a resized window, said computer program product comprising:

first computer readable program code means for drawing within the resized window a resized first display to a first scale having a first height and a first width that fits within the resized window with said first data in the tabular format rescaled to conform to said resized first display, said resized first display drawn only when said first height is greater than a predetermined minimum height threshold representing a height below which the first data is considered to be unreadable in the tabular format; and second computer readable program code means for drawing a resized second display within the resized window to a second scale having a second height and a second width to fill the height and a remaining width of the resized window, wherein the second data in the graphical format is rescaled to conform to said resized second display.

16. A computer program product according to claim 15, wherein said minimum height threshold is calculated from a number of visible rows multiplied by a number of pixels that a row requires to be readable for a given font style and size.

17. A computer program product according to claim 16, wherein said given font style and size are constant and said required number of pixels are constant.

18. A computer program product according to claim 15, wherein said computer program product further comprises:

third computer readable program code means for enabling a computer to determine if the resized window is zoomed; and fourth computer readable program code means for enabling a computer to draw a zoomed view of the first display and the second display to the resized window if said third computer readable program code means determines that the resized window is zoomed.

19. A computer program product according to claim 15, wherein said tabular format comprises a tabular representation of the first data in a spreadsheet, wherein said spreadsheet comprising a plurality of rows, and wherein said graphical format comprises a graphical representation of one or more data values in said spreadsheet.

20. A computer program product according to claim 19, wherein said first drawing means comprises means for drawing the first display to a constant width, and wherein said first drawing means does not draw the first display when the width of the resized window is less than said constant width.

21. A computer program product according to claim 19, wherein said second computer readable program code means comprises means for enabling a computer to proportionally adjusting said rows of said spreadsheet to fit within said first height of said resized first display.

22. A computer program product for use with a windows environment, said computer program product comprising:

a computer usable medium having computer readable program code method steps embodied in said medium for resizing a window on a computer screen, the window containing a first display for displaying first data in a tabular format and a second display for displaying second data in a graphical format, the resized window having a height and a width, the resized first display having a first width and a first height and the resized second display having a second width and a second height, the method steps comprising the steps of:

(a) determining whether the resized first display has a first height that is greater than a predetermined minimum height threshold representing a height below which the data is unreadable when displayed in said tabular format;

(b) drawing to said first scale the first display when said step (a) determines that said first height is greater than said predetermined minimum height threshold;

(c) resealing the first data in the tabular format to conform to the resized first display when said step (b) is performed;

(d) drawing a resized second display within the resized window to a second scale having a second height and a second width to fill the height and a remaining width of the resized window after said steps (b) and (c) are performed; and (e) resealing the second data in the graphical format within the second display to conform to said resized second display.

23. A computer program product according to claim 22, wherein said minimum height threshold is calculated from a number of visible rows multiplied by a number of pixels that a row requires to be readable for a given font style and size.

24. A computer program product according to claim 22, wherein said first width is a constant width, the method further comprising the step of:

(f) determining, prior to said step (b), whether said constant width is less than or equal to the width of the resized window;

wherein said step (b) further includes the step of:

(1) drawing the first resized display to said constant width when said step (d) determines that said constant width is less than or equal to said resized window width.

25. A computer program product according to claim 22, wherein said tabular format includes a plurality of rows of data, and wherein said step (b) comprises the step of:

(1) proportionally adjusting a plurality of rows of the first display to fit within the height of the resized window.

26. A program storage device readable by a machine, tangibly embodying a program of instructions executable by the machine to perform the means for resizing a window containing a first display for displaying a first data in a tabular format and a second display for displaying a second data in a graphical format, to a height and a width thereby creating a resized window, said program storage device comprising:

first drawing means for drawing within the resized window a resized first display to a first scale having a first height and a first width that fits within the resized window with said first data in the tabular format resealed to conform to said resized first display, said resized first display drawn only when said first height is greater than a predetermined minimum height threshold representing a height below which the first data is considered to be unreadable in the tabular format; and second drawing means for drawing a resized second display within the resized window to a second scale having a second height and a second width to fill the height and a remaining width of the resized window, wherein the second data in the graphical format is resealed to conform to said resized second display.

27. A program storage device according to claim 26, wherein said minimum height threshold is calculated from a number of visible rows multiplied by a number of pixels that a row requires to be readable for a given font style and size.

28. A program storage device according to claim 27, wherein said given font style and size are constant and said required number of pixels are constant.

29. A program storage device according to claim 26, wherein said tabular format comprises a tabular representation of the first data in a spreadsheet, wherein said spreadsheet comprising a plurality of rows, and wherein said graphical format comprises a graphical representation of one or more data values in said spreadsheet.

30. A program storage device according to claim 29, wherein said first drawing means comprises means for drawing the first display to a constant width, and wherein said first drawing means does not draw the first display when the width of the resized window is less than said constant width.

31. A program storage device according to claim 29, wherein said first drawing means comprises:

means for proportionally adjusting said rows of said spreadsheet to fit within said first height of said resized first display.

32. A computer system for resizing a window containing a first display for displaying a first data in a first format and a second display for displaying a second data in a second format, to a height and a width thereby creating a resized window, comprising:

first drawing means for drawing within the resized window a resized first display to a first scale having a first height and a first width that fits within the resized window with said first data rescaled to conform to said resized first display, said resized first display drawn only when at least one of said first height and said first width is greater than a predetermined minimum height and width threshold, respectively, representing a dimension below which the first data is considered to be unreadable in said first format, said minimum height threshold being calculated from a number of visible rows multiplied by a number of pixels that a row requires to be readable for a given font style and size; and second drawing means for drawing a resized second display within the resized window to a second scale having a second height and a second width to fill a remaining height and width of the resized window, wherein the second data is rescaled to conform to said resized second display.

33. A computer system according to claim 32, wherein said first format comprises a tabular representation of the first data in a spreadsheet, wherein said spreadsheet comprising a plurality of rows, and wherein said second format comprises a graphical representation of one or more data values in said spreadsheet.

34. A method for resizing a window on a computer screen, the window containing a first display for displaying first data in a first format and a second display for displaying second data in a second format, the resized window having a height and a width, the resized first display having a first width and a first height and the resized second display having a second width and a second height, the method comprising the steps of:

(a) determining whether the resized first display has at least one of a first height or first width that is greater than a predetermined minimum height and width threshold, respectively, representing a dimension below which the data is unreadable when displayed in said first format, said minimum height threshold being is calculated from a number of visible rows multiplied by a number of pixels that a row requires to be readable for a given font style and size;

(b) drawing to said first scale the first display when said step (a) determines that said at least one of a first height or width is greater than said respective threshold;

(c) resealing the first data in the first format to conform to the resized first display when said step (b) is performed;

(d) drawing a resized second display within the resized window to a second scale having a second height and a second width to fill a remaining height and width of the resized window after said steps (b) and (c) are performed; and (e) rescaling the second data in the second format within the second display to conform to said resized second display.

* * * * *